US012175822B2

(12) United States Patent
Ishiguro et al.

(10) Patent No.: US 12,175,822 B2
(45) Date of Patent: Dec. 24, 2024

(54) BILL HANDLING APPARATUS, BILL HANDLING METHOD AND RECORDING METHOD

(71) Applicant: FUJITSU FRONTECH LIMITED, Tokyo (JP)

(72) Inventors: Keita Ishiguro, Tokyo (JP); Tomoaki Ogawa, Tokyo (JP); Masashi Iijima, Tokyo (JP); Takashi Watanabe, Tokyo (JP)

(73) Assignee: FUJITSU FRONTECH LIMITED, Tokyo (JP)

( * ) Notice: Subject to any disclaimer, the term of this patent is extended or adjusted under 35 U.S.C. 154(b) by 0 days.

(21) Appl. No.: 18/586,708

(22) Filed: Feb. 26, 2024

(65) Prior Publication Data

US 2024/0194016 A1 Jun. 13, 2024

Related U.S. Application Data

(63) Continuation of application No. PCT/JP2021/035719, filed on Sep. 28, 2021.

(51) Int. Cl.
*G07D 11/22* (2019.01)
*G07D 11/14* (2019.01)
*G07D 11/50* (2019.01)

(52) U.S. Cl.
CPC ............. *G07D 11/22* (2019.01); *G07D 11/14* (2019.01); *G07D 11/50* (2019.01)

(58) Field of Classification Search
CPC ........ G07D 11/14; G07D 11/22; G07D 11/50; G07D 7/00; G07D 7/02; G07D 2211/00
USPC .......................................................... 209/534
See application file for complete search history.

(56) References Cited

FOREIGN PATENT DOCUMENTS

| | | | | | |
|---|---|---|---|---|---|
| CN | 1494707 | A | * | 5/2004 | ......... G06Q 20/1085 |
| CN | 101414394 | A | * | 4/2009 | ......... G07D 11/0006 |
| CN | 201725363 | U | | 1/2011 | |
| CN | 104217490 | A | * | 12/2014 | ............... G07D 7/00 |
| EP | 1158470 | A2 | * | 11/2001 | .............. G06M 7/06 |
| JP | 10-214360 | A | | 8/1998 | |

(Continued)

OTHER PUBLICATIONS

International Search Report dated Nov. 16, 2021 for international Application No. PCT/JP2021/035719.

(Continued)

*Primary Examiner* — Terrell H Matthews
(74) *Attorney, Agent, or Firm* — STAAS & HALSEY LLP

(57) ABSTRACT

A bill handling apparatus enables insertion of a deposited object therein from an insertion slot, the object including a bill containing a metallic component. The bill handling apparatus includes a memory and processing circuitry coupled to a memory and configured to estimate a number of bills in the object that has been inserted, obtain an actually measured metal quantity in the object that has been inserted, estimate a threshold that is a quantity of metal in the object that has been inserted, based on the number of bills estimated by the first estimating and a reference metal quantity corresponding to one of the bills, the reference metal quantity having been determined beforehand, make a comparison between the actually measured metal quantity and the threshold, and determine, based on a result of the comparison, whether or not the object that has been inserted is a bill or bills only.

8 Claims, 9 Drawing Sheets

(56) References Cited

FOREIGN PATENT DOCUMENTS

| | | | | | |
|---|---|---|---|---|---|
| JP | H10-214360 | A | | 8/1998 | |
| JP | H10-241001 | A | | 9/1998 | |
| JP | 2008-58241 | A | | 3/2008 | |
| JP | 2016-33783 | A | | 3/2016 | |
| JP | 2017-151503 | A | | 8/2017 | |
| JP | 2019-57269 | A | | 4/2019 | |
| WO | WO-2018061129 | A1 | * | 4/2018 | ............ B41J 13/103 |

OTHER PUBLICATIONS

Written Opinion of the International Searching Authority dated Nov. 16, 2021 for international Application No. PCT/JP2021/035719.

* cited by examiner

FIG.4

| DENOMINATION | UNITARY NUMBER OF BILLS | QUANTITY OF METAL CORRESPONDING TO UNITARY NUMBER OF BILLS |
|---|---|---|
| BILL A | 100 | 10 |
| BILL B | | 600 |
| BILL C | | 100 |
| COIN A | 1 | 1000 |
| COIN B | | 800 |
| COIN C | | 500 |

FIG.5

41

| DENOMINATION (41A) | UNITARY NUMBER OF BILLS (41B) | REFERENCE BILL THICKNESS CORRESPONDING TO UNITARY NUMBER OF BILLS (41C) | REFERENCE METAL QUANTITY CORRESPONDING TO UNITARY NUMBER OF BILLS (41D) |
|---|---|---|---|
| BILL A | 10 | 1000 μm | 1 |
| BILL B | | 1000 μm | 60 |
| BILL C | | 1000 μm | 10 |

BILL HANDLING APPARATUS, BILL HANDLING METHOD AND RECORDING METHOD

CROSS-REFERENCE TO RELATED APPLICATION

This application is a continuation of International Application No. PCT/JP2021/035719, filed on Sep. 28, 2021, the entire contents of which are incorporated herein by reference.

FIELD

The embodiment discussed herein is related to a bill handling apparatus, a bill handling method and a recording medium.

BACKGROUND

Bills are inserted into a bill handling apparatus through an insertion slot in the bill handling apparatus for the bills to be deposited in the bill handling apparatus. Some bills, such as ruble bills, for example, contain metallic components.

However, coins may sometimes be inadvertently inserted in the insertion slot in the bill handling apparatus even though the insertion slot is dedicated to bills. A conventional bill handling apparatus thus has a metal sensor in its insertion slot and if a coin is inserted in the insertion slot and insertion of foreign matter, such as a coin, in the insertion slot is detected on the basis of a quantity of metal detected by the metal sensor, the coin will be returned.

Patent Literature 1: Japanese Laid-open Patent Publication No. 2019-057269

Patent Literature 2: Japanese Laid-open Patent Publication No. 10-241001

Patent Literature 3: Japanese Laid-open Patent Publication No. 10-214360

In a case where a bundle of bills containing a large quantity of metal is inserted from an insertion slot in a bill handling apparatus, the quantity of metal in the bundle of bills inserted may be equal to or larger than the quantity of metal in a coin. However, in the case where the quantity of metal in the bundle of bills inserted in the bill handling apparatus is equal to or larger than the quantity of metal in a coin, the insertion of the bundle of bills may be erroneously detected as inclusion of foreign matter. As a result of the detection of the inclusion of foreign matter, even though what has been deposited in the bill handling apparatus is bills only, the bundle of bills will be returned.

SUMMARY

According to an aspect of an embodiment, a bill handling apparatus enables insertion of a deposited object therein from an insertion slot, the deposited object including a bill containing a metallic component. The bill handling apparatus includes a memory, and processing circuitry coupled to the memory. The processing circuitry is configured to estimate a number of bills in the deposited object that has been inserted, and obtain an actually measured metal quantity in the deposited object that has been inserted. The processing circuitry is configured to estimate a determination threshold that is a quantity of metal in the deposited object that has been inserted, based on the number of bills estimated by the first estimating and a reference metal quantity corresponding to one of the bills, the reference metal quantity having been determined beforehand. The processing circuitry is configured to make a comparison between the actually measured metal quantity and the determination threshold, and determine, based on a result of the comparison, whether or not the deposited object that has been inserted is a bill or bills only.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of quantities of metal in bills;

FIG. 5 is a diagram illustrating an example of a template table;

DESCRIPTION OF EMBODIMENTS

Embodiments of a bill handling apparatus, for example, disclosed by the present application will hereinafter be described in detail on the basis of the drawings. Techniques disclosed herein are not limited by the embodiments. Furthermore, the following embodiments may be combined with one another as appropriate so long as no contradiction is caused by the combination.

Embodiment

Configuration of Bill Handling Apparatus 1

Figure 1:
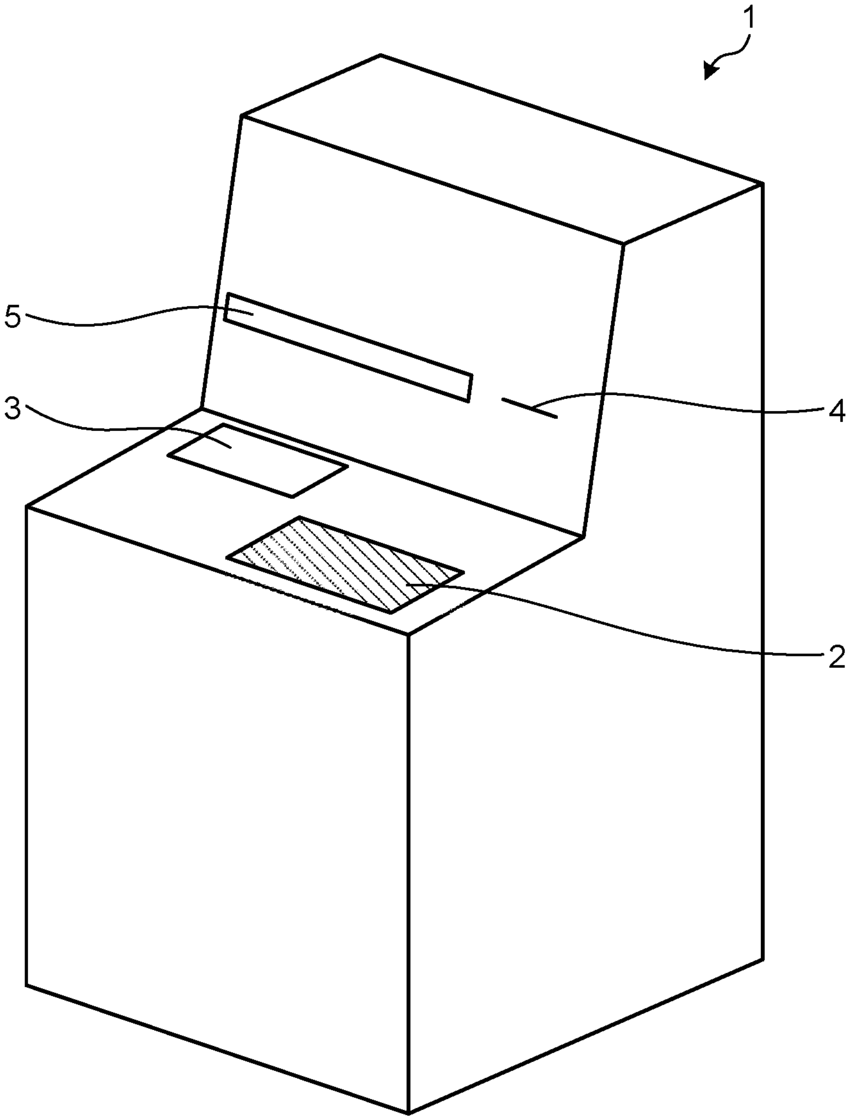
FIG. 1 is a diagram illustrating an example of the external appearance of a bill handling apparatus according to an embodiment.

FIG. 1 is a diagram illustrating an example of the external appearance of a bill handling apparatus 1 according to an embodiment. The bill handling apparatus 1 illustrated in FIG. 1 is, for example, an automatic teller machine (ATM). The bill handling apparatus 1 is, for example, a handling apparatus that enables depositing and withdrawing of bills, such as ruble bills containing a metallic component. The metallic component is, for example, a metallic component that has been mixed in paper fiber of the bills and/or ink on the bills. The bill handling apparatus 1 has a touch panel 2, an insertion slot 3, a card slot 4, and a bankbook slot 5.

The touch panel 2 is an operation panel where various types of information are displayed and various commands are input. The insertion slot 3 is a depositing and withdrawing slot where a deposited object, for example, a bill is deposited in or withdrawn from the bill handling apparatus 1. The card slot 4 is, for example, an inlet and outlet where a cash card is inserted in the bill handling apparatus 1 or ejected from the bill handling apparatus 1. The bankbook slot 5 is an inlet and outlet where a bankbook is inserted in the bill handling apparatus 1 or ejected from the bill handling apparatus 1.

Figure 2:
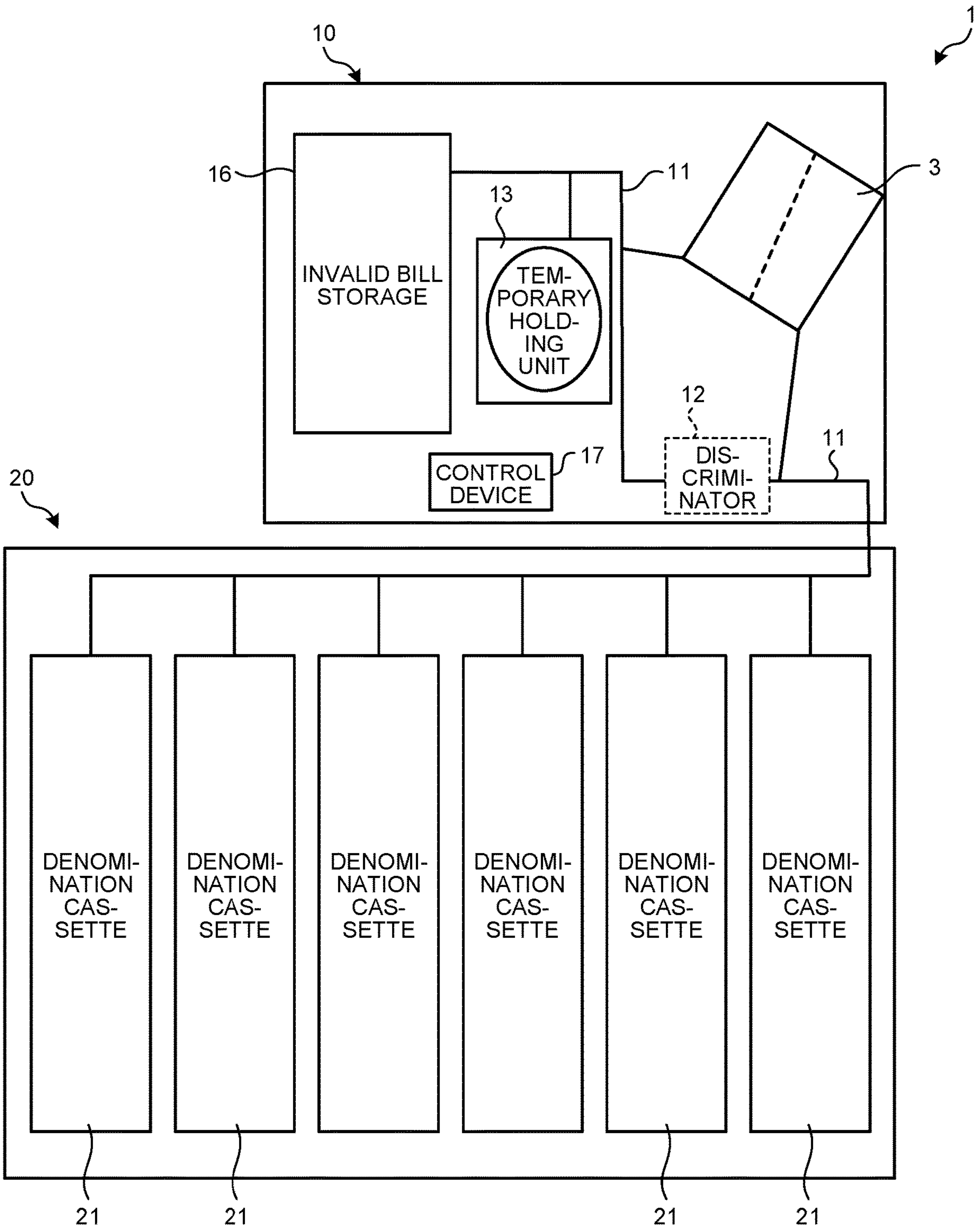
FIG. 2 is a diagram illustrating an example of an internal configuration of the bill handling apparatus.

FIG. 2 is a diagram illustrating an example of an internal configuration of the bill handling apparatus 1. The bill handling apparatus 1 illustrated in FIG. 2 has a conveyance unit 10 and a storage unit 20. The conveyance unit 10 has the insertion slot 3, a conveyor 11, a discriminator 12, a temporary holding unit 13, an invalid bill storage 16, and a control device 17.

The conveyor 11 is a mechanical mechanism that conveys bills to be deposited to each part of the bill handling apparatus 1. The discriminator 12 performs discrimination among predetermined classification conditions including denominations of bills deposited from the insertion slot 3. The classification conditions include, for example, denominations, states of damage, and external dimensions. The denominations are used as the classification conditions, and a denomination of a bill is determined on the basis of discrimination data related to denominations set in the discriminator 12 beforehand. In a case where the denomination of a bill, for example, a bill with missing part is unable to be determined by the discriminator 12, the bill is returned to the insertion slot 3 from the discriminator 12 without being fed to the temporary holding unit 13 from the discriminator 12.

The invalid bill storage 16 is a storage that stores any bill determined as an invalid bill by the discriminator 12. In a case where a bill is determined as an invalid bill by the discriminator 12, for example, the conveyor 11 conveys the bill to the invalid bill storage 16 to store the bill in the invalid bill storage 16, after conveying the bill to the temporary holding unit 13.

The storage unit 20 has, for example, six denomination cassettes 21 that store bills discriminated on the basis of their denominations. The conveyor 11 causes a bill to be temporarily held in the temporary holding unit 13 on the basis of the denomination of the bill determined by the discriminator 12, for example, and thereafter conveys the bill to the denomination cassette 21 corresponding to the denomination of the bill to store the bill in that denomination cassette 21.

Configuration of Control Device 17

Figure 3:
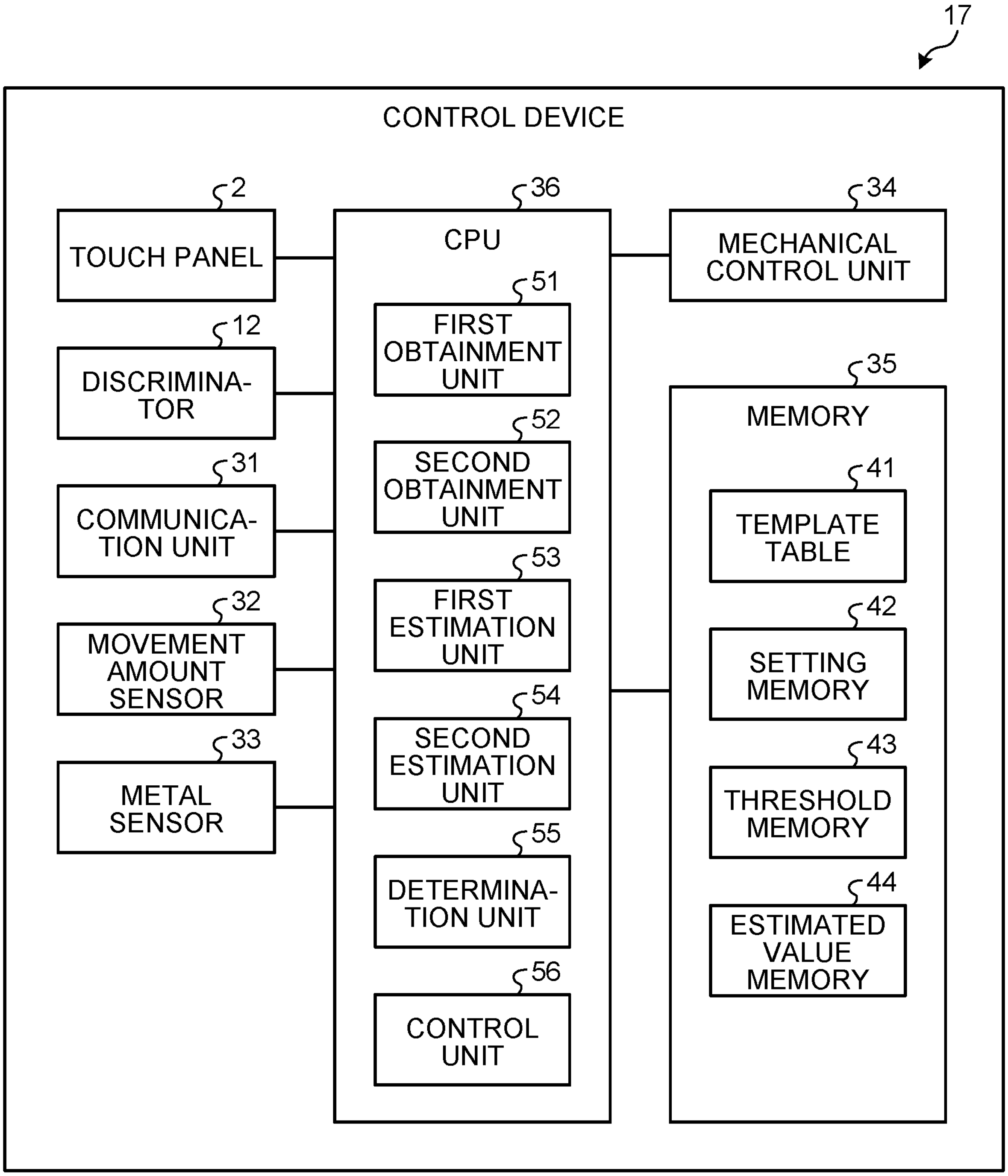
FIG. 3 is a block diagram illustrating an example of a functional configuration of a control device.

FIG. 3 is a block diagram illustrating an example of a functional configuration of the control device 17. The control device 17 illustrated in FIG. 3 has, in addition to the touch panel 2 and the discriminator 12, a communication unit 31, a movement amount sensor 32, a metal sensor 33, a mechanical control unit 34, a memory 35, and a CPU 36. The communication unit 31 is a communication interface that communicates with a server of a financial institution. The movement amount sensor 32 is, for example, a sensor that measures an actually measured movement time of a pressure plate 3C in the insertion slot 3. The movement amount sensor 32 measures an actually measured movement time up to completion of movement at a predetermined moving velocity from an initial position of the pressure plate 3C in the insertion slot 3 to a position where the pressure plate 3C presses bills on a stage plate 3B at a predetermined level.

The metal sensor 33 is, for example, a sensor that is arranged at the stage plate 3B in the insertion slot 3 and that measures a quantity of metal in a deposited object placed on the stage plate 3B. The metal sensor 33 measures the quantity of metal in the deposited object, as a value converted from electric current, for example. The mechanical control unit 34 controls, for example, the mechanical mechanism, such as the conveyor 11. The memory 35 stores various types of information related to the control device 17. The CPU 36 controls the overall control device 17.

The CPU 36 has a first obtainment unit 51, a second obtainment unit 52, a first estimation unit 53, a second estimation unit 54, a determination unit 55, and a control unit 56. The first obtainment unit 51 obtains, as an actually measured metal quantity, a quantity of metal in a deposited object in the insertion slot 3, the quantity of metal having been measured by the metal sensor 33. The second obtainment unit 52 obtains an actually measured movement time for the pressure plate 3C, the actually measured movement time having been measured by the movement amount sensor 32.

The first estimation unit 53 executes an estimation process of calculating an estimated bill count that is an estimation of the number of bills to be deposited in the insertion slot 3. The estimated bill count is the estimated number of bills to be deposited in the insertion slot 3. The first estimation unit 53 obtains a reference bill thickness (mm) and a reference metal quantity (mg) that correspond to a unitary number of bills, from a template table 41. The first estimation unit 53 is, for example, a thickness obtainment unit that calculates a reference bill thickness corresponding to one bill, by dividing the reference bill thickness corresponding to the unitary number of bills by the unitary number of bills. The first estimation unit 53 obtains an actually measured movement time (m seconds) from the second obtainment unit 52 and calculates a thickness (mm) of bills to be deposited in the insertion slot 3, by, for example, multiplying a result of subtraction of a margin from the actually measured movement time by a moving velocity (mm/msec) of the pressure plate 3C. The margin is a time for absorption of an error in the actually measured movement time. For example, the first estimation unit 53 calculates an estimated bill count for the deposited object by dividing the calculated thickness of the bills to be deposited by the reference bill thickness corresponding to one bill and stores the calculated estimated bill count in an estimated value memory 44.

The second estimation unit 54 calculates an estimated metal quantity in a deposited object in the insertion slot 3. The estimated metal quantity is an estimated quantity of metal in the deposited object in the insertion slot 3. The second estimation unit 54 calculates, for example, a reference metal quantity corresponding to one bill by dividing the reference metal quantity corresponding to the unitary number of bills by the unitary number of bills. For example, the second estimation unit 54 calculates the estimated metal quantity in the deposited object by multiplying the calculated reference metal quantity corresponding to one bill by the calculated estimated bill count for the deposited object. The second estimation unit 54 obtains a determination threshold by adding an adjustment value stored in a setting memory 42 to the calculated estimated metal quantity and stores the determination threshold into a threshold memory 43. The determination threshold is a threshold for determining whether or not the deposited object is a bill or bills. The adjustment value is a margin for clarifying discrimination between a quantity of metal in a bundle of bills and a quantity of metal additionally including foreign matter (for example, a coin) other than bills. For convenience of description, in the above described example, the determination threshold is calculated by adding the adjustment value to the estimated metal quantity in the deposited object, but the estimated metal quantity may serve as the determination threshold without addition of the adjustment value.

The determination unit 55 determines whether or not an actually measured metal quantity in a deposited object in the insertion slot 3 is equal to or less than the determination threshold, the actually measured metal quantity having been obtained by the first obtainment unit 51. In a case where the actually measured metal quantity in the deposited object is equal to or less than the determination threshold, the determination unit 55 determines that the deposited object is a bill or bills only. Furthermore, in a case where the actually measured metal quantity in the deposited object exceeds the determination threshold, the determination unit 55 determines that the deposited object includes foreign matter or a coin other than bills. The control unit 56 controls the overall CPU 36.

Configuration of Memory 35

The memory 35 has the template table 41, the setting memory 42, the threshold memory 43, and the estimated value memory 44. The template table 41 is a table that stores reference bill thicknesses and reference metal quantities for respective bills of different denominations set beforehand. The setting memory 42 is a memory that stores various types of setting information, such as a margin provided to a determination threshold and a moving velocity of the pressure plate 3C. The threshold memory 43 is a memory that stores a determination threshold calculated by the second estimation unit 54. The estimated value memory 44 is a memory that stores an estimated bill count calculated by the first estimation unit 53.

FIG. 4 is a diagram illustrating an example of quantities of metal in bills. The currency in a case supposed herein has, for example, three types of bills and three types of coins that contain a metallic component. The quantity of metal corresponding to 100 bills for bills A is 10 mg, the quantity of metal corresponding to 100 bills for bills B is 600 mg, and the quantity of metal corresponding to 100 bills for bills C is 100 mg. The quantity of metal corresponding to one coin for coins A is 1000 mg, the quantity of metal corresponding to one coin for coins B is 800 mg, and the quantity of metal corresponding to one coin for coins C is 500 mg. Therefore, with the conventional technology, a large number of bills in a bundle of bills in the insertion slot 3 may be determined as inclusion of a coin in the deposited object in the insertion slot 3.

FIG. 5 is a diagram illustrating an example of the template table 41. The template table 41 illustrated in FIG. 5 is a table for management of, for each denomination 41A, a unitary number of bills 41B, a reference bill thickness 41C corresponding to the unitary number of bills and calculated beforehand, and a reference metal quantity 41D corresponding to the unitary number of bills and calculated beforehand. The reference bill thickness corresponding to ten of the bills A is 1000 μm and the reference metal quantity corresponding to ten of the bills A is 1 mg. The reference bill thickness corresponding to ten of the bills B is 1000 μm and the reference metal quantity corresponding to ten of the bills B is 60 mg. The reference bill thickness corresponding to ten of the bills C is 1000 μm and the reference metal quantity corresponding to ten of the bills C is 10 mg. The template table 41 illustrated in FIG. 5 is an example of a case where reference bill thicknesses and reference metal quantities corresponding to a unitary number of bills for different denominations of bills of a certain country are stored in the template table 41 beforehand. However, this may be modified as appropriate, and for example, reference bill thicknesses and reference metal quantities corresponding to a unitary number of bills for different denominations of bills of different countries may be stored beforehand.

Method of Measuring Thickness of Bills to be Deposited in Insertion Slot 3

Figure 6:
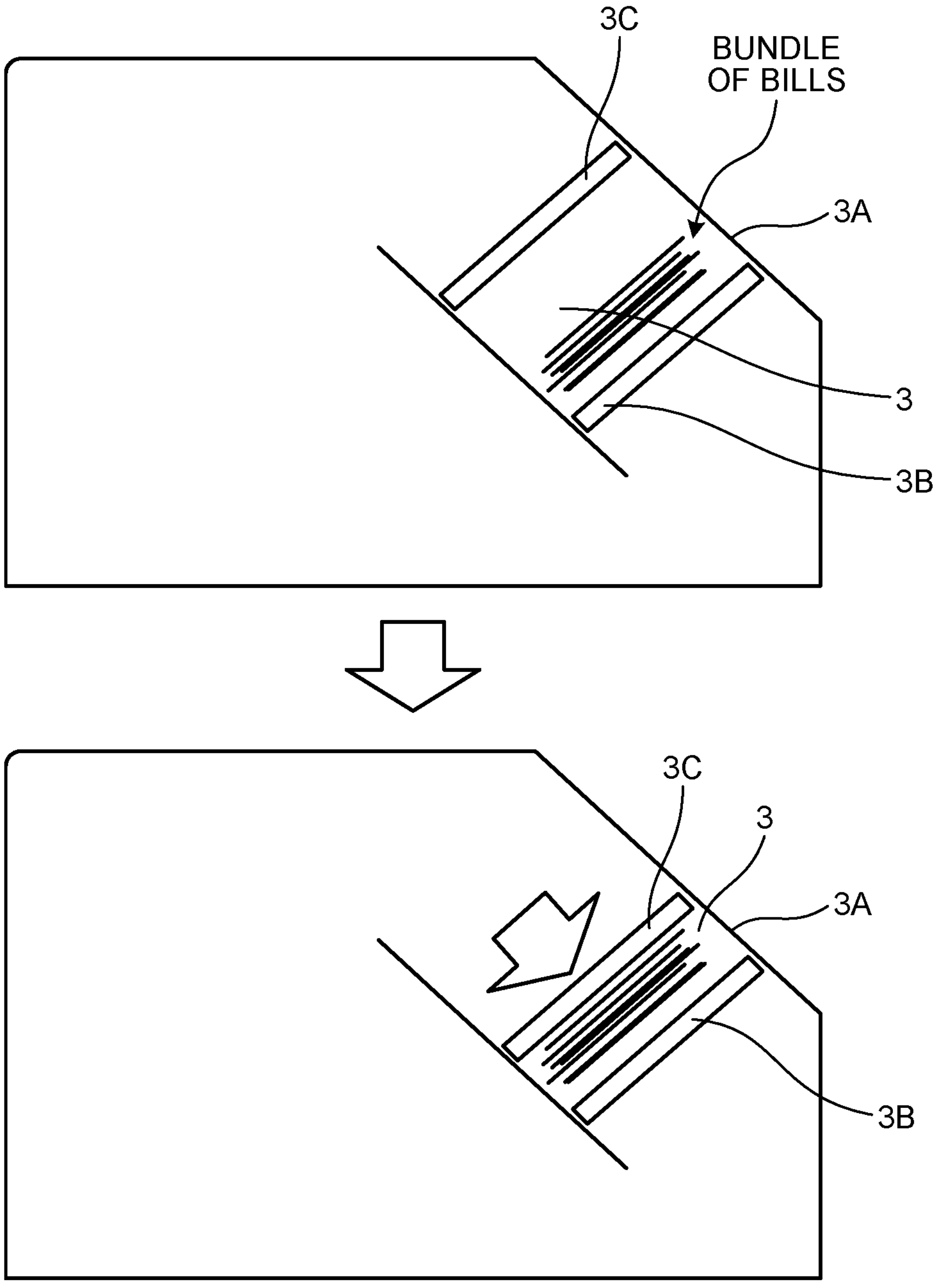
FIG. 6 is a diagram illustrating an example of a method of measuring a thickness of bills to be deposited in an insertion slot in the bill handling apparatus.

FIG. 6 is a diagram illustrating an example of a method of measuring a thickness of bills to be deposited in the insertion slot 3 in the bill handling apparatus 1. The insertion slot 3 in the bill handling apparatus 1 illustrated in FIG. 6 has a shutter 3A, the stage plate 3B, and the pressure plate 3C. The shutter 3A is a door that closes and opens an opening of the insertion slot 3. The stage plate 3B is a plate where the deposited object, for example, a bundle of bills in the insertion slot 3 is placed. The pressure plate 3C is a plate that moves perpendicularly to a surface of the stage plate 3B and presses bills placed on the stage plate 3B with a predetermined level of pressure. The mechanical control unit 34 controls driving of the pressure plate 3C. The movement amount sensor 32 measures an actually measured movement time after insertion of the deposited object in the insertion slot 3 up to arrival of the pressure plate 3C at a position from the initial position of the pressure plate 3C, the position being where the bills are pressed with the predetermined level of pressure. The second obtainment unit 52 obtains the actually measured movement time for the pressure plate 3C and measured by the movement amount sensor 32. The first estimation unit 53 calculates, on the basis of the actually measured movement time measured, as well as a predetermined velocity of the pressure plate 3C and a margin that have been stored in the setting memory 42, a thickness of the bills to be deposited.

Depositing Process at Bill Handling Apparatus 1

Figure 7:
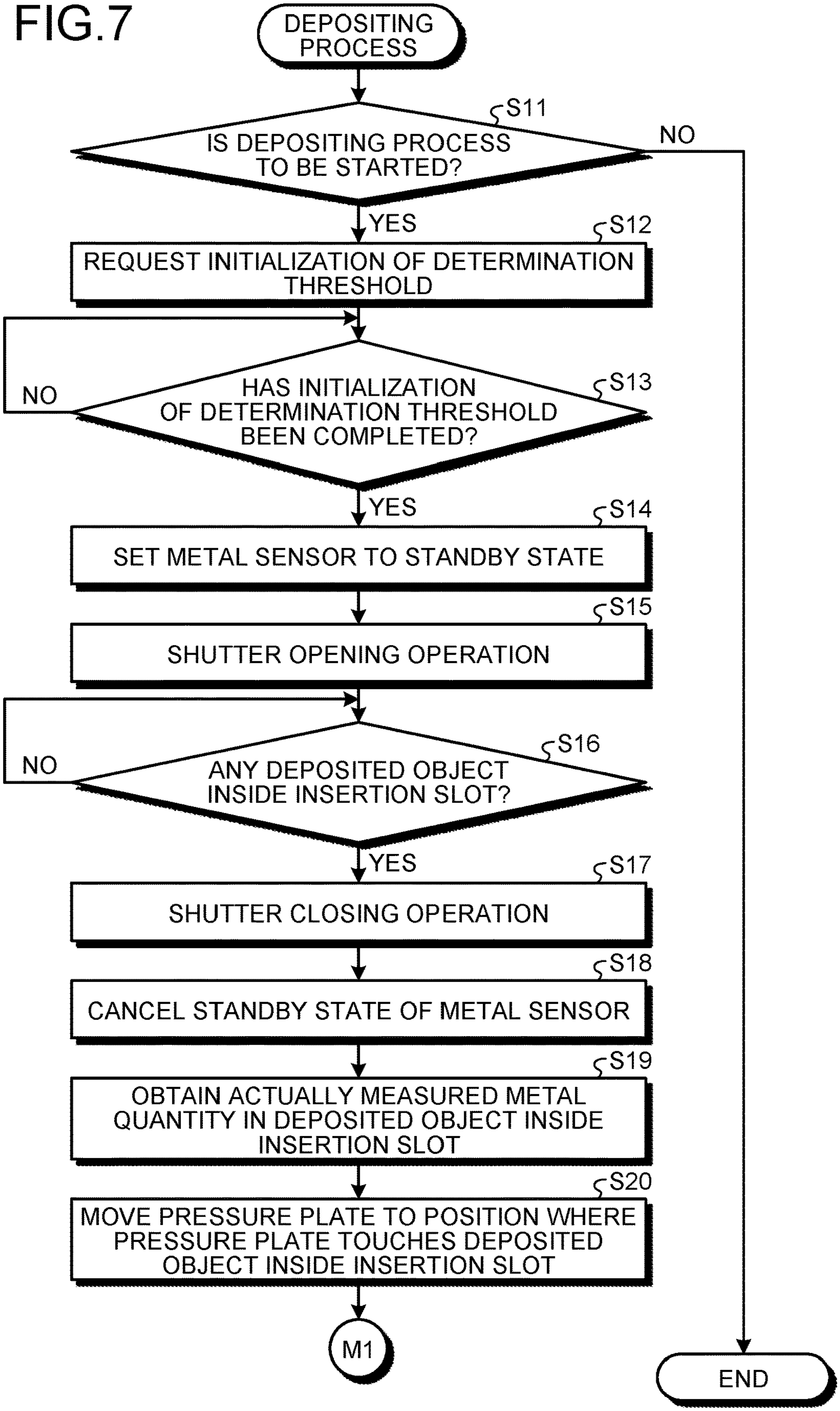
FIG. 7 is a flowchart illustrating an example of processing operation by a CPU, the processing operation being related to a depositing process.
Figure 8:
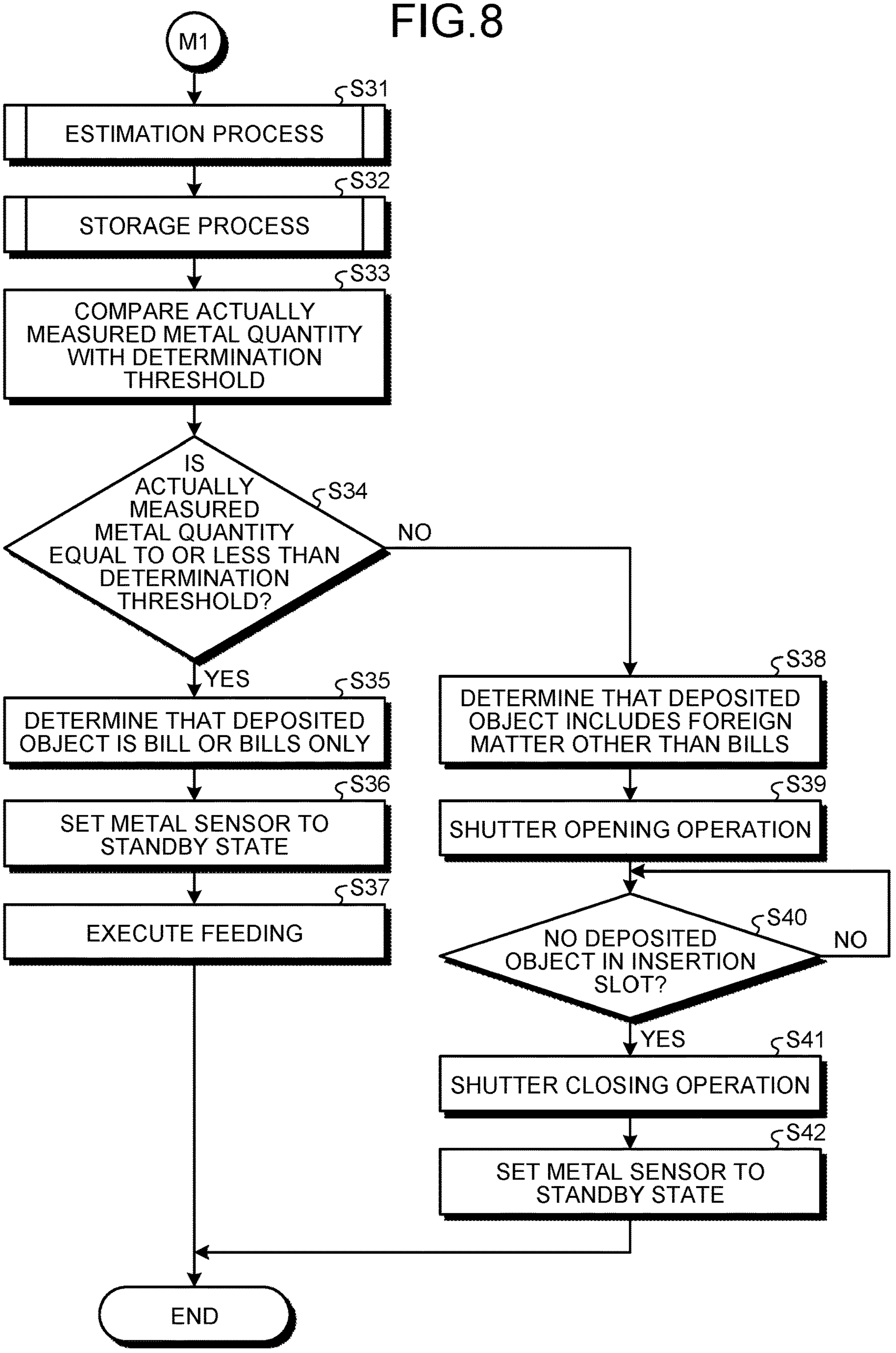
FIG. 8 is a flowchart illustrating the example of the processing operation by the CPU, the processing operation being related to the depositing process.

FIG. 7 and FIG. 8 are flowcharts illustrating an example of processing operation related to a depositing process and implemented by the CPU 36. The depositing process is a process executed in a case where a deposited object, for example, a bundle of bills has been inserted in the insertion slot 3. As illustrated in FIG. 7, the control unit 56 in the CPU 36 makes a determination of whether or not the depositing process for the deposited object inserted in the insertion slot 3 is to be started (Step S11). This determination of whether or not the depositing process is to be started is determined on the basis of whether or not depositing operation has been detected.

In a case where a depositing process for a deposited object is to be started (Step S11: Yes), the control unit 56 requests initialization of a determination threshold (Step S12). The request for initialization of the determination threshold is a request for initialization of the determination threshold that has been stored in the threshold memory 43. That is, every time a depositing process is started, the control unit 56 initializes the determination threshold in the threshold memory 43. The control unit 56 determines whether or not the initialization of the determination threshold has been completed (Step S13). Completion of the initialization of the determination threshold means completion of the initialization of the determination threshold that has been stored in the threshold memory 43.

In a case where the initialization of the determination threshold has been completed (Step S13: Yes), the control unit 56 sets the metal sensor 33 to a standby state (Step S14).

Setting the metal sensor 33 to the standby state is a process of setting the metal sensor 33 to be prepared for measurement of a quantity of metal. The control unit 56 controls the mechanical control unit 34 to cause the shutter 3A, which opens and closes the opening of the insertion slot 3, to open (Step S15).

The control unit 56 determines whether or not a deposited object is in the insertion slot 3 after causing the shutter 3A to open (Step S16). In a case where a deposited object is in the insertion slot 3 (Step S16: Yes), the control unit 56 controls the mechanical control unit 34 to cause the shutter 3A of the insertion slot 3 to close (Step S17). After the shutter 3A has been caused to close, the first obtainment unit 51 in the CPU 36 cancels the standby state of the metal sensor 33 (Step S18). Cancelling the standby state of the metal sensor 33 is a process of starting measurement of the metal sensor 33. The first obtainment unit 51 obtains an actually measured metal quantity in the deposited object inside the insertion slot 3 through the metal sensor 33 (Step S19). The control unit 56 moves, through the mechanical control unit 34, the pressure plate 3C to press the bills placed on the stage plate 3B with the predetermined level of pressure (Step S20) and proceeds to Ml illustrated in FIG. 8.

In a case where a depositing process is not to be started (Step S11: No), the control unit 56 ends the processing operation illustrated in FIG. 8. In a case where the initialization of the determination threshold has not been completed (Step S13: No), the control unit 56 proceeds to Step S13 to determines whether or not the initialization of the determination threshold has been completed. In a case where a deposited object is not inside the insertion slot 3 (Step S16: No), the control unit 56 repeats Step S16 until a deposited object is inserted in the insertion slot 3.

Figure 9:
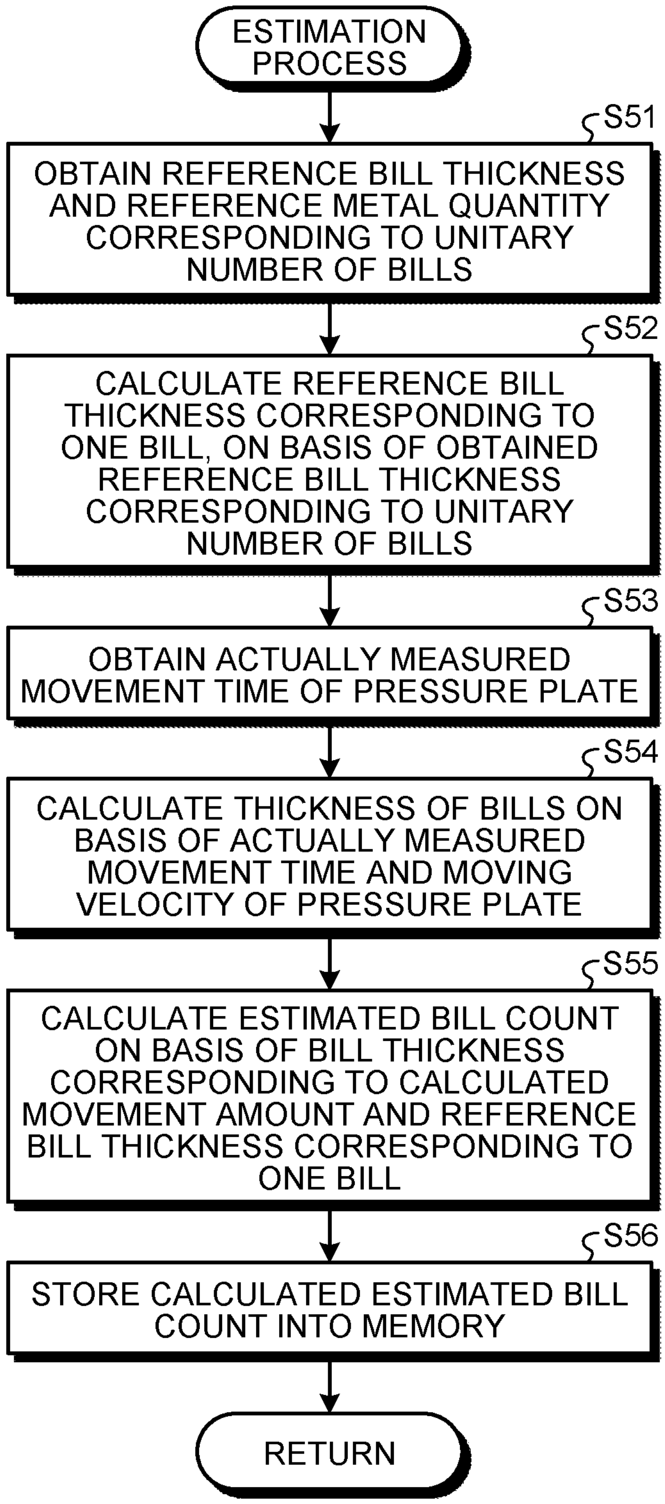
FIG. 9 is a flowchart illustrating an example of processing operation by the CPU, the processing operation being related to an estimation process.

As illustrated in FIG. 8, the first estimation unit 53 in the CPU 36 executes an estimation process of estimating the number of bills in the deposited object that is inside the insertion slot 3, the estimation process being illustrated in FIG. 9. After estimating the number of bills that are in the insertion slot 3, the second estimation unit 54 in the CPU 36 executes a storage process of storing the determination threshold, the storage process being illustrated in FIG. 10.

After executing the storage process of storing the determination threshold, the second estimation unit 54 compares the actually measured metal quantity in the deposited object, the actually measured metal quantity being a result of the obtainment at Step S19, and the determination threshold obtained in the storage process at Step S32 with each other (Step S33). The determination unit 55 in the CPU 36 determines whether or not the actually measured metal quantity in the deposited object is equal to or less than the determination threshold (Step S34).

In a case where the actually measured metal quantity in the deposited object is equal to or less than the determination threshold (Step S34: Yes), the determination unit 55 determines that the deposited object is a bill or bills only (Step S35). After determining that the deposited object is only a bill or bills, the control unit 56 sets the metal sensor 33 to the standby state (Step S36), executes feeding of the bills to be deposited inside the insertion slot 3 (Step S37), and ends the processing operation illustrated in FIG. 8. The feeding is operation of sending out the bills to be deposited inside the insertion slot 3 to convey the bills by means of the conveyor 11.

In a case where the actually measured metal quantity in the deposited object is not equal to or less than the determination threshold (Step S34: No), the determination unit 55 determines that the deposited object includes foreign matter other than bills (Step S38). In a case where the deposited object inside the insertion slot 3 has been determined to include foreign matter other than bills, the control unit 56 controls the mechanical control unit 34 to cause the shutter 3A of the insertion slot 3 to open (Step S39).

After causing the shutter 3A to open, the control unit 56 determines whether or not the deposited object is no longer in the insertion slot 3, that is, whether or not the deposited object has been taken out from the insertion slot 3 (Step S40). In a case where the deposited object has been taken out from the insertion slot 3 (Step S40: Yes), the control unit 56 controls the mechanical control unit 34 to cause the shutter 3A to close (Step S41). After causing the shutter 3A to close, the control unit 56 sets the metal sensor 33 to the standby state (Step S42) and ends the processing operation illustrated in FIG. 8.

In a case where the deposited object is still in the insertion slot 3 (Step S40: No), the control unit 56 proceeds to Step S40 to determine whether or not the deposited object has been taken out from the insertion slot 3.

Estimation Process by Bill Handling Apparatus 1

FIG. 9 is a flowchart illustrating an example of processing operation related to the estimation process and implemented by the CPU 36. The estimation process illustrated in FIG. 9 is a process of estimating the number of bills inside the insertion slot 3. As illustrated in FIG. 9, the first estimation unit 53 obtains a reference bill thickness and a reference metal quantity that correspond to a unitary number of bills, from the template table 41 (Step S51).

For example, the first estimation unit 53 calculates a reference bill thickness corresponding to one bill by dividing the reference bill thickness corresponding to the unitary number of bills by the unitary number of bills (Step S52). Through the movement amount sensor 32, the first obtainment unit 51 obtains an actually measured movement time to completion of movement to a position where the pressure plate 3C presses the deposited object at the predetermined level of pressure from the initial position of the pressure plate 3C on the bills inside the insertion slot 3 (Step S53).

The first estimation unit 53 calculates a thickness of the bills to be deposited inside the insertion slot 3 by, for example, multiplying a result of subtraction of a margin from the actually measured movement time, by a moving velocity of the pressure plate 3C (Step S54). Furthermore, on the basis of a result of division of the thickness of the bills to be deposited by the reference bill thickness corresponding to one bill, the first estimation unit 53 calculates an estimated bill count for the deposited object inside the insertion slot 3 (Step S55). The first estimation unit 53 then stores the calculated estimated bill count for the deposited object, into the estimated value memory 44 (Step S56) and ends the processing operation illustrated in FIG. 9.

Storage Process by Bill Handling Apparatus 1

Figure 10:
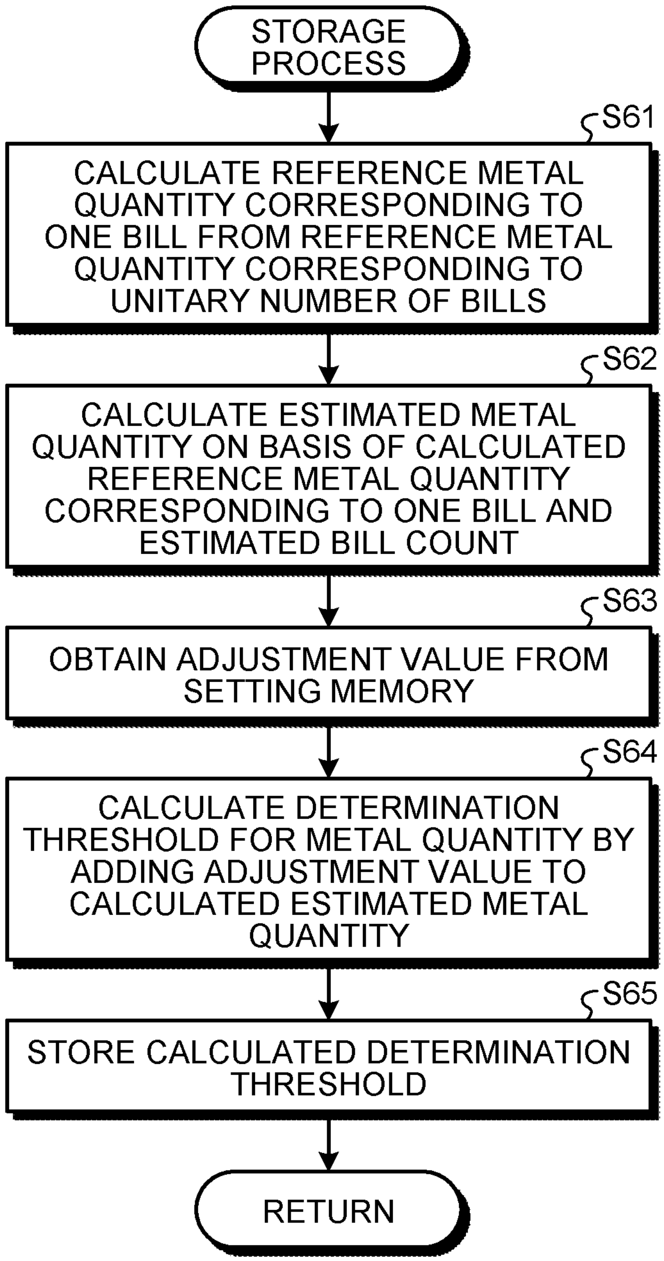
FIG. 10 is a flowchart illustrating an example of processing operation by the CPU, the processing operation being related to a storage process.

FIG. 10 is a flowchart illustrating an example of processing operation related to the storage process and implemented by the CPU 36. As illustrated in FIG. 10, for example, the second estimation unit 54 calculates a reference metal quantity corresponding to one bill by dividing a reference metal quantity corresponding to a unitary number of bills by the unitary number of bills (Step S61). The second estimation unit 54 calculates an estimated metal quantity in a deposited object by multiplying the reference metal quantity corresponding to one bill by the estimated bill count calculated by the first estimation unit 53 (Step S62).

The second estimation unit 54 obtains an adjustment value from the setting memory 42 (Step S63) and calculates a determination threshold for a metal quantity by adding the adjustment value to the estimated metal quantity calculated (Step S64). The second estimation unit 54 stores the calculated determination threshold for the metal quantity into the threshold memory 43 (Step S65) and ends the processing operation illustrated in FIG. 10. That is, a determination threshold is stored, for every depositing process for a deposited object, on the basis of an estimated bill count for the deposited object, a reference metal quantity corresponding to one bill, and an adjustment value.

For convenience of description, in the processes of FIG. 7, FIG. 8, FIG. 9, and FIG. 10, the bills to be deposited are assumed to be of one type of denomination that is one of the bills A, bills B, or bills C, the bills to be deposited all having the same reference metal quantity. However, for example, as long as the bills A, the bills B, and the bills C have the same reference metal quantity, the processes are applicable to a case where bills of different denominations are included in the deposited object.

Effects of Embodiment

The bill handling apparatus 1 estimates, on the basis of an estimated bill count and a reference metal quantity corresponding to one bill, a determination threshold that is an estimated metal quantity in a deposited object inserted in the insertion slot 3. The bill handling apparatus 1 makes a comparison between an actually measured metal quantity and the determination threshold, and determines, on the basis of a result of the comparison, whether or not the deposited object inserted is a bill or bills only. As a result, storing a determination threshold for every deposited object inserted in the insertion slot 3 enables prevention of erroneous detection of the deposited object.

The first estimation unit 53 measures a thickness of inserted bills to be deposited, and estimates, on the basis of the measured thickness of the bills and a reference bill thickness corresponding to one bill, the number of inserted bills to be deposited. As a result, the number of bills to be deposited that have been inserted in the insertion slot 3 is able to be estimated.

In a case where the actually measured metal quantity is equal to or less than the determination threshold, the determination unit 55 determines that the deposited object inserted is a bill or bills only. As a result, the bill handling apparatus 1 enables prevention of erroneous detection of the deposited object and recognition of a deposit of a bill or bills only.

In a case where the actually measured metal quantity exceeds the determination threshold, the determination unit 55 determines that the deposited object inserted includes foreign matter other than bills. As a result, the bill handling apparatus 1 enables prevention of erroneous detection of the deposited object and recognition of a deposit including foreign matter, such as a coin.

OTHER EMBODIMENTS

For convenience of description, in the above described example, for every deposited object inside the insertion slot 3, a determination threshold is calculated by addition of an estimated metal quantity in the deposited object and an adjustment value together. However, the determination threshold is not limited to this example, and the estimated metal quantity in the deposited object may be set as the determination threshold for every deposited object inside the insertion slot 3.

In a case where the estimated metal quantity in the deposited object is set as the determination threshold, the determination unit 55 determines that the deposited object inserted is a bill or bills only if a difference between the actually measured metal quantity and the determination threshold is equal to or less than a predetermined value. The predetermined value is in the above described range of the adjustment value. As a result, the bill handling apparatus 1 is able to recognize a deposit of a bill or bills only in a case where the difference is equal to or less than the predetermined value.

In a case where the difference between the actually measured metal quantity and the determination threshold exceeds the predetermined value, the determination unit 55 determines that the deposited object inserted includes foreign matter other than bills. As a result, the bill handling apparatus 1 is able to recognize a deposit including foreign matter, such as a coin.

In the above described example, the bill handling apparatus 1 according to the embodiment is, for example, an automatic teller machine (ATM), but this may be modified as appropriate, and for example, the bill handling apparatus 1 may be any other type of bill handling apparatus, such as a cash dispenser (CD), a teller cash recycler (TCR), or a money changer.

The components of each unit illustrated in the drawings may be not configured physically as illustrated in the drawings. That is, specific forms of distribution and integration of each unit are not limited to those illustrated in the drawings, and all or part of each unit may be configured to be distributed or integrated functionally or physically in any units, according to various loads and/or use situations, for example.

All or any part of various processing functions implemented by each device may be executed on a central processing unit (CPU) (or a microcomputer, such as a micro processing unit (MPU) or a micro controller unit (MCU)). Furthermore, all or any part of the various processing functions may of course be executed on a program analyzed and executed by a CPU (or a microcomputer, such as an MPU or MCU) or on hardware by wired logic.

In one aspect, a bill handling apparatus that enables prevention of erroneous detection of a deposited object upon depositing, for example, is to be provided.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A bill handling apparatus that enables insertion of a deposited object therein from an insertion slot, the deposited object including a bill containing a metallic component, the bill handling apparatus comprising:

a memory;

and processing circuitry coupled to the memory and configured to:

estimate a number of bills in the deposited object that has been inserted;

obtain an actually measured metal quantity in the deposited object that has been inserted;

estimate a determination threshold that is a quantity of metal in the deposited object that has been inserted, based on the number of bills estimated by the first estimating and a reference metal quantity corresponding to one of the bills, the reference metal quantity having been determined beforehand; and make a comparison between the actually measured metal quantity and the determination threshold, and determine, based on a result of the comparison, whether or not the deposited object that has been inserted is a bill or bills only.

2. The bill handling apparatus according to claim 1, wherein the first estimating includes obtaining a thickness of the bills in the deposited object that has been inserted, and estimating the number of the bills in the deposited object that has been inserted, based on the thickness of the bills obtained and a reference bill thickness corresponding to one of the bills, the reference bill thickness having been determined beforehand.

3. The bill handling apparatus according to claim 1, wherein the determining determines that the deposited object that has been inserted is the bill or bills only in a case where the actually measured metal quantity is equal to or less than the determination threshold.

4. The bill handling apparatus according to claim 3, wherein the determining determines that the deposited object that has been inserted includes foreign matter other than the bills, in a case where the actually measured metal quantity exceeds the determination threshold.

5. The bill handling apparatus according to claim 1, wherein the determining determines that the deposited object that has been inserted is the bill or bills only in a case where a difference between the actually measured metal quantity and the determination threshold is equal to or less than a predetermined value.

6. The bill handling apparatus according to claim 5, wherein the determining determines that the deposited object that has been inserted includes foreign matter other than the bills, in a case where the difference between the actually measured metal quantity and the determination threshold exceeds the predetermined value.

7. A bill handling method executed by a bill handling apparatus that enables insertion of a deposited object therein from an insertion slot, the deposited object including a bill containing a metallic component, the bill handling method comprising:

estimating a number of bills in the deposited object that has been inserted;

obtaining an actually measured metal quantity in the deposited object that has been inserted;

estimating a determination threshold that is a quantity of metal in the deposited object that has been inserted, based on the number of bills estimated and a reference metal quantity corresponding to one of the bills, the reference metal quantity having been determined beforehand; and making a comparison between the actually measured metal quantity and the determination threshold, and determining, based on a result of the comparison, whether or not the deposited object that has been inserted is a bill or bills only.

8. A computer-readable recording medium having stored therein a bill handling program that causes a computer to execute a process, the computer being in a bill handling apparatus that enables insertion of a deposited object therein from an insertion slot, the deposited object including a bill containing a metallic component, the process comprising:

estimating a number of bills in the deposited object that has been inserted;

obtaining an actually measured metal quantity in the deposited object that has been inserted;

estimating a determination threshold that is a quantity of metal in the deposited object that has been inserted, based on the number of bills estimated and a reference metal quantity corresponding to one of the bills, the reference metal quantity having been determined beforehand; and making a comparison between the actually measured metal quantity and the determination threshold, and determining, based on a result of the comparison, whether or not the deposited object that has been inserted is a bill or bills only.

* * * * *